(12) United States Patent
Green

(10) Patent No.: US 10,406,992 B2
(45) Date of Patent: Sep. 10, 2019

(54) MALE AND FEMALE MOUNTING ASSEMBLY

(71) Applicant: Leo Green, Rienzi, MS (US)

(72) Inventor: Leo Green, Rienzi, MS (US)

( * ) Notice: Subject to any disclaimer, the term of this patent is extended or adjusted under 35 U.S.C. 154(b) by 127 days.

(21) Appl. No.: 15/665,617

(22) Filed: Aug. 1, 2017

(65) Prior Publication Data

US 2019/0039530 A1     Feb. 7, 2019

(51) Int. Cl.
*B60R 11/02*     (2006.01)
*B60R 11/04*     (2006.01)
*B60R 11/00*     (2006.01)

(52) U.S. Cl.
CPC .......... *B60R 11/0258* (2013.01); *B60R 11/02* (2013.01); *B60R 11/0241* (2013.01); *B60R 11/0252* (2013.01); *B60R 11/04* (2013.01); *B60R 2011/0005* (2013.01); *B60R 2011/0063* (2013.01); *B60R 2011/0078* (2013.01)

(58) Field of Classification Search
USPC ...................................................... 248/205.3
See application file for complete search history.

(56) References Cited

U.S. PATENT DOCUMENTS

| | | | | |
|---|---|---|---|---|
| 6,003,260 | A * | 12/1999 | Chang ...................... | G09F 1/12 248/472 |
| 9,611,881 | B2 * | 4/2017 | Khodapanah .......... | F16M 13/02 |
| 2003/0141329 | A1 * | 7/2003 | Huang ...................... | A45F 5/02 224/197 |
| 2013/0181584 | A1 * | 7/2013 | Whitten ................ | G06F 1/1656 312/223.1 |
| 2015/0362824 | A1 * | 12/2015 | Cunningham, III ... | F16M 13/04 396/423 |

* cited by examiner

*Primary Examiner* — Monica E Millner

(57) ABSTRACT

A male and female mounting assembly include a female fastener body, a male fastener body, a locking mechanism, and a release button to secure electronic devices or any other apparatus to a flat surface. The female fastener body that independently functions as an ornamental body and the male fastener body that is connected to a device are operatively coupled to each other through the locking mechanism that is positioned within the female fastener body. The release button is operatively coupled with the locking mechanism so that the release button can separate the male fastener body and the female fastener body from each other by applying pressure to the release button. Resultantly, the female fastener body and the male fastener body collectively function as a mounting assembly to secure a device.

19 Claims, 12 Drawing Sheets

MALE AND FEMALE MOUNTING ASSEMBLY

FIELD OF THE INVENTION

The present invention relates generally to a mounting assembly. More specifically, the present invention is a male and female mounting assembly that allows an object or device to be secured to variety of surfaces while providing an ornamental aspect.

BACKGROUND OF THE INVENTION

Mounting systems and docking systems are generally utilized to mount electronic devices to a horizontal or vertical surface, wherein the electronic devices can include, but is not limited to, mobile phones, portable navigation systems, computer tablets, and portable cameras. For example, drivers normally utilize a mounting system to secure their mobile phones to a dashboard of a vehicle so that the mobile phones can be used as hard free device while they drive. Even though, existing mounting systems enable users to secure different electronic devices to many different surfaces, all of those existing mounting systems provide cumbersome, unattractive, and unnecessary appearance when electronic devices are not secured.

It is therefore an objective of the present invention to provide a male and female mounting system to secure electronic devices or any other apparatus. More specifically, a female fastener body of the present invention is designed to adhere with multiple surface, to engage with a male fastener body of the present invention that is adhered to an electronic device or any other apparatus, and to function as an ornamental body when the male fastener body is not engaged. As a result, the present invention is able to function as mounting system when an electrical device is secured and decorative element when an electrical device is not secured.

DETAIL DESCRIPTIONS OF THE INVENTION

All illustrations of the drawings are for the purpose of describing selected versions of the present invention and are not intended to limit the scope of the present invention.

Figure 1:
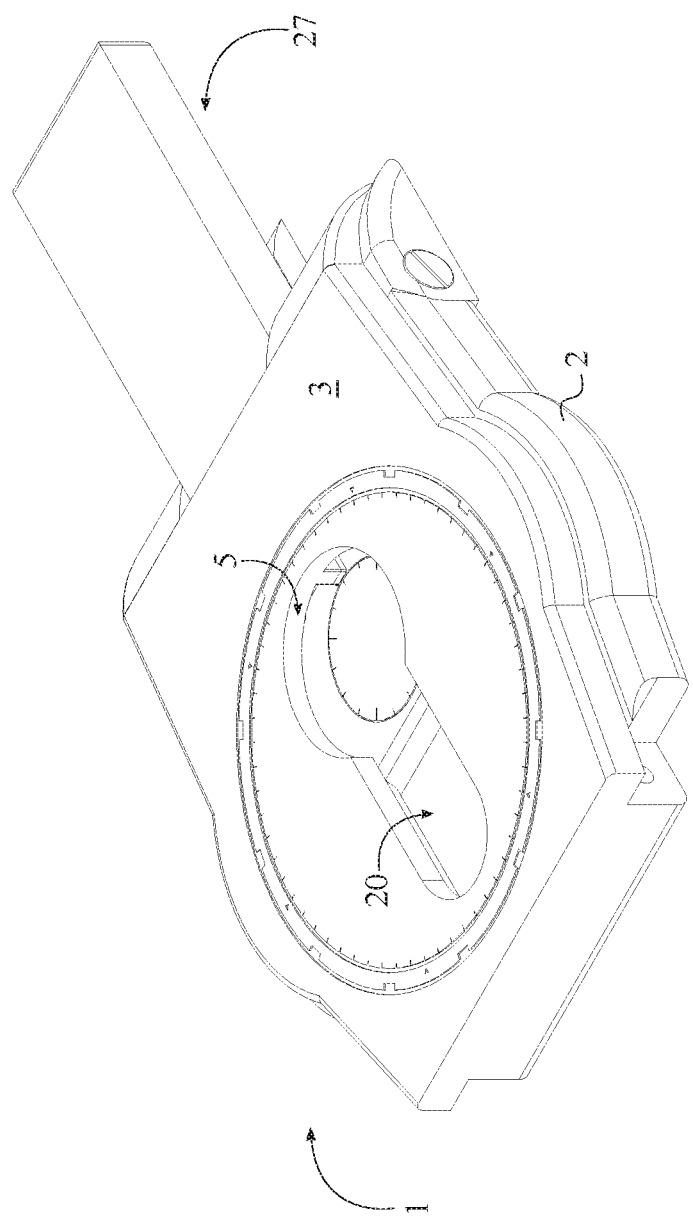
FIG. 1 is a top perspective view of the female fastener body, the locking mechanism, and the release button of the present invention.
Figure 10:
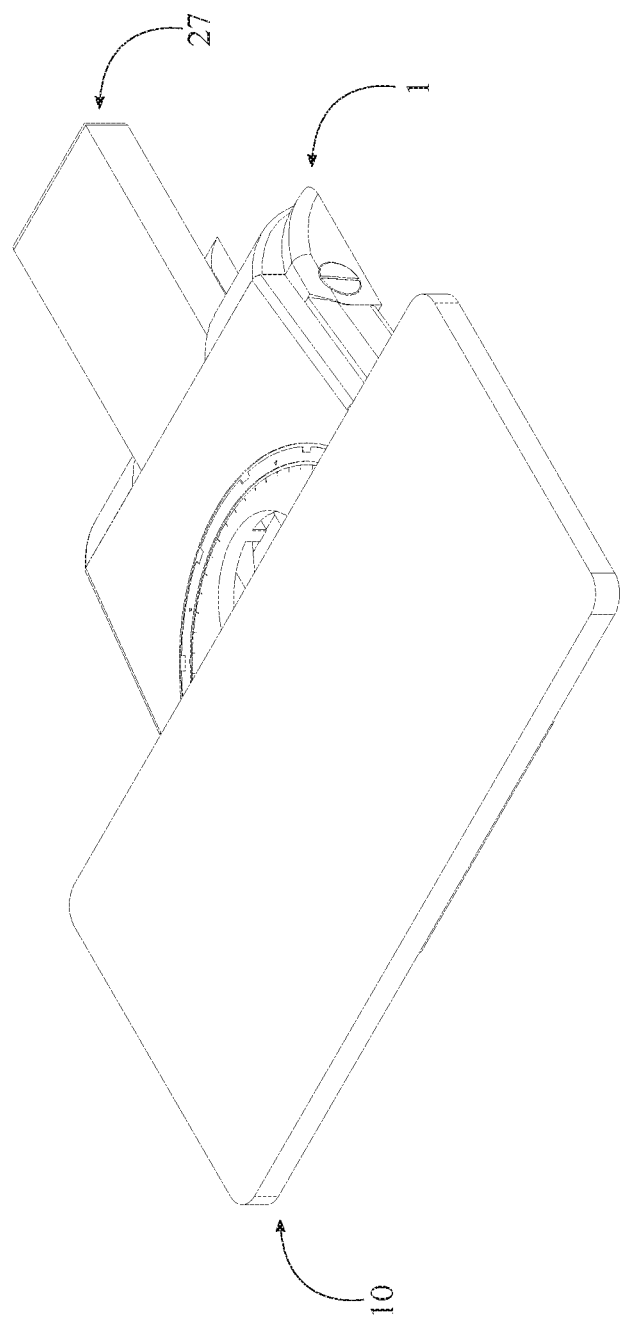
FIG. 10 is a top perspective view of the present invention.

The present invention is a male and female mounting assembly that can securely fasten any devices to any flat surface. Additionally, the present invention also functions as an ornamental body when a device is not attached to a flat surface. The present invention comprises a female fastener body 1 that comprises an encasement 2 and a mounting socket 5, a male fastener body 10, a locking mechanism 20, and a release button 27 as shown in FIG. 1 and FIG. 10. The female fastener body 1 is designed to secure with a flat surface, and the male fastener body 10 is designed to secure with a device so that the female fastener body 1 and the male faster body can function as the male and female mounting assembly. In reference to general configuration of the present invention, the mounting socket 5 traverses into the encasement 2 through an ornamental front wall 3 of the encasement 2 so that the mounting socket 5 can accept a mounting stud 13 and a flange 14 of the male fastener body 10. The locking mechanism 20 is integrated within the encasement 2, and the release button 27 is laterally traverses into the encasement 2. Resultantly, the release button 27 is operatively coupled to the locking mechanism 20 within the encasement 2 completing the female fastener body 1. The mounting stud 13 of the male fastener body 10 is removably engaged with the mounting socket 5 through the locking mechanism 20 thus completing the male and female mounting assembly.

Figure 2:
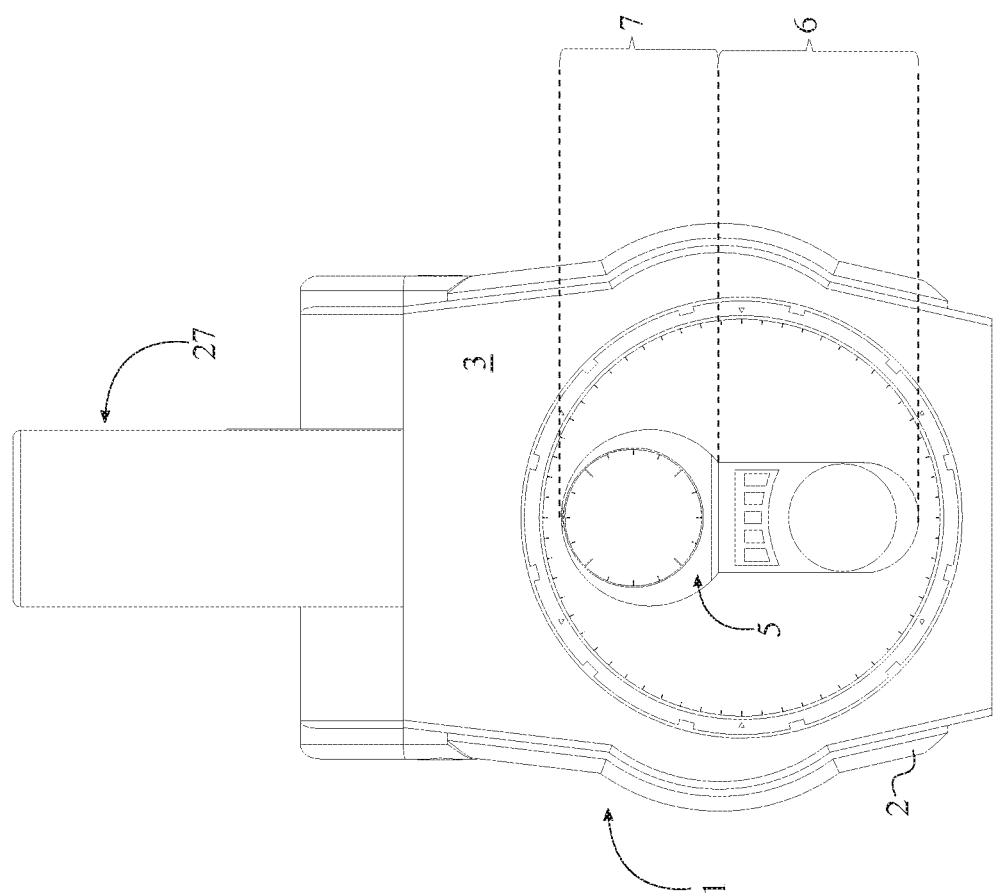
FIG. 2 is a top view of the female fastener body, the locking mechanism, and the release button of the present invention.

The ornamental front wall 3 can be formed into many different appearances so that the female fastener body 1 can provide an aesthetically please look when the male fastener body 10 is not coupled. In reference to FIG. 1-2, the preferred embodiment for the ornamental front wall 3 delineates dial appearance thus eliminating cumbersome and unattractive front appearance from the female fastener body 1.

The mounting socket 5, which receives the mounting stud 13, comprises a stadium section 6 and a circular section 7 in order to properly secure the male fastener body 10 to the female fastener body 1. In reference to FIG. 2, the circular section 7 is positioned adjacent to the release button 27. The stadium section 6 is positioned adjacent to the circular section 7, opposite of the release button 27. For example, when the male fastener body 10 is engaged with the female fastener body 1, the circular section 7 first receives the mounting stud 13. Then, the mounting stud 13 can be push down or slide along the stadium section 6 in order to secure the mounting stud 13 within the mounting socket 5. In order to accomplish this securing method, a diameter of the circular section 7 is generally larger than a diameter of the stadium section 6 within the female fastener body 1 so that the mounting stud 13 can be inserted through the circular section 7 and locked within the stadium section 6.

Figure 3:
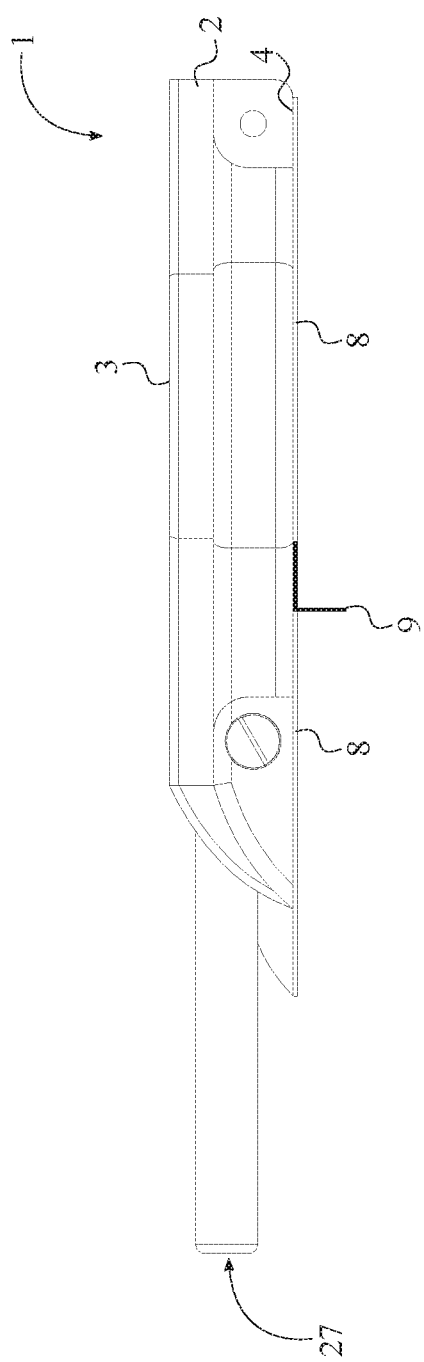
FIG. 3 is a side view of the female fastener body and the release button of the present invention.
Figure 4:
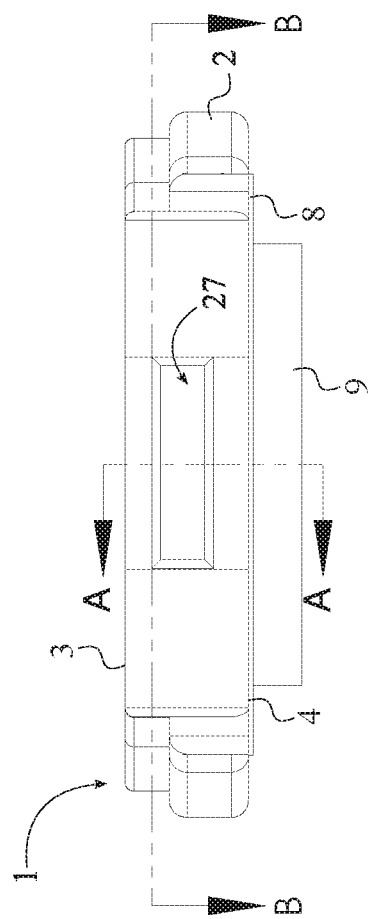
FIG. 4 is a side view of the female fastener body and the release button of the present invention, showing the plane upon which a cross sectional view is taken shown in FIG. 5 and FIG. 6.
Figure 5:
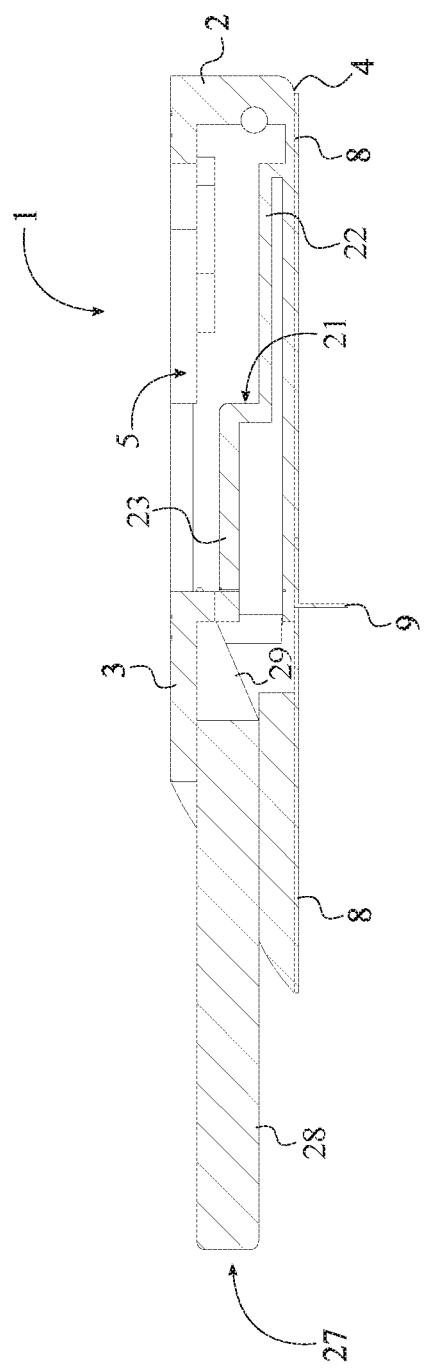
FIG. 5 is a cross section view the female fastener body of the present invention taken along line A-A of FIG. 4, showing the locking mechanism of the present invention.

In reference to FIG. 3-5, the female fastener body 1 further comprises a first adhesive layer 8 and a bracket 9 to secure the encasement 2 to a flat surface. More specifically, the bracket 9 is positioned opposite of the mounting socket 5 in such a way that the bracket 9 is externally connected to a rear wall 4 of the encasement 2. The first adhesive layer 8 is perimetrically superimposed over the rear wall 4 and encircled around the bracket 9. When the encasement 2 is secured to a flat surface, the bracket 9 is intended to traverse into an exciting cavity of the flat surface or a cavity that is created within the flat surface to provide additional support to the female fastener body 1. More specifically, the preferred embodiment of the bracket 9 is a L-shaped member, wherein a first leg of the L-shaped bracket 9 is connected to the rear wall 4 of the encasement 2 and a second leg of the L-shaped bracket 9 is traversed into the exciting or formed cavity. For example, the bracket 9 functions as a hanger and can be placed permanently on any flat surface with an opening, preferably 4.5 mm in depth, that is formed with the use of a diamond wheel bit and a drill. As a result, the female fastener body 1 can be positioned on any wall, over any crevice or any desired location such as driver's cockpit and on a back of seat headrest to create a mounting mechanism for holding any hand held electronic devices. The first adhesive layer 8 is preferably a double sided adhesive tape. One side of the first adhesive layer 8 is superimposed over the rear wall 4 of the encasement 2 while opposite side of the first adhesive layer 8 is covered with a removable film that can be removed before securing to the flat surface.

Figure 6:
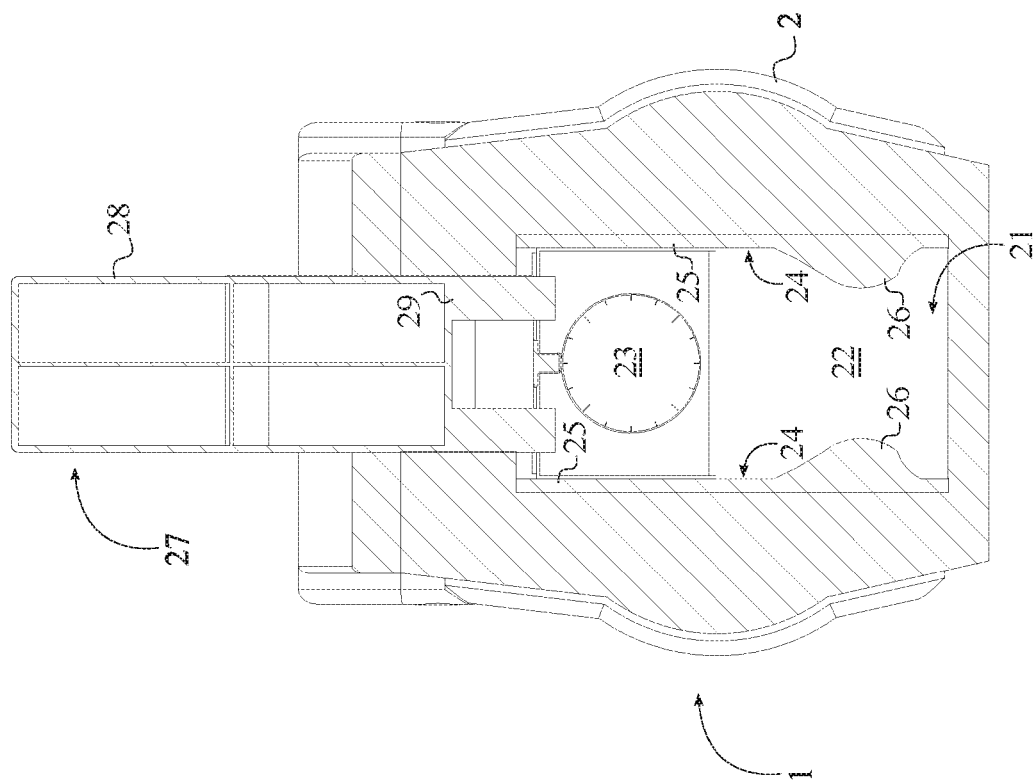
FIG. 6 is a cross section view the female fastener body of the present invention taken along line B-B of FIG. 4, showing the locking mechanism of the present invention.

The locking mechanism 20, which couples the female fastener body 1 and the male fastener body 10 together, comprises a locking plate 21 and a pair of guide tracks 24. As shown in FIG. 5-6, the locking plate 21 is terminally connected to the encasement 2. The pair of guide tracks 24 is positioned along the locking plate 21 and connected to the encasement 2. Due to the positioning of the locking plate 21 and the pair of guide tracks 24, the release button 27 is then able to terminally and operatively coupled with the locking plate 21 so that the mounting stud 13 can be engaged with the mounting socket 5 or disengaged from the mounting socket 5.

In reference to FIG. 5-6, the locking plate 21 comprises a first platform 22 and a second platform 23 that collectively function to retain the mounting stud 13 within the mounting socket 5. More specifically, the first platform 22 is terminally connected within the encasement 2. The second platform 23 is terminally connected to the first platform 22 in such a way that the first platform 22 and the second platform 23 are positioned offset of each other. In other words, the first platform 22 is adjacently positioned with the rear wall 4 while the second platform 23 is adjacently positioned with the ornamental front wall 3. Additionally, the pair of guide tracks 24 comprises an elongated section 25 and a waved section 26. The elongated section 25 is positioned adjacent to the second platform 23, and the waved section 26 is positioned adjacent to the first platform 22. More specifically, the first platform 22 and the waved section 26 are extended along the stadium section 6 while the second platform 23 and the elongated section 25 are extended along the circular section 7 as shown in FIG. 1.

The release button 27 that operatively coupled to the locking mechanism 20 through the locking plate 21 comprises an elongated body 28 and at least one incline leg 29. In reference to FIG. 5-6, the elongated body 28 laterally traverses into the encasement 2 from a bottom end of the release button 27 while a top end of the release button 27 projects out of the encasement 2. As a result, the user can access the release button 27 from the top end activate the locking mechanism 20. The at least one incline leg 29 is positioned within the encasement 2 and terminally connected to the elongated body 28 from the bottom end. The at least one incline leg 29 is operatively coupled with the locking plate 21 thus allowing the user to change the positioning of the locking plate 21. More specifically, the second platform 23 is operatively coupled with the at least one incline leg 29 within the encasement 2. As a result, when a user applies pressure to the release button 27, the release button 27 moves towards the mounting socket 5 as the at least one incline leg 29 presses down the locking plate 21. When a user removes applied pressure from the release button 27, the release button 27 moves away from the mounting socket 5 and at least one incline leg 29 slide away from the mounting socket 5 thus allowing the locking plate 21 to retract back to its natural positioning.

Figure 7:
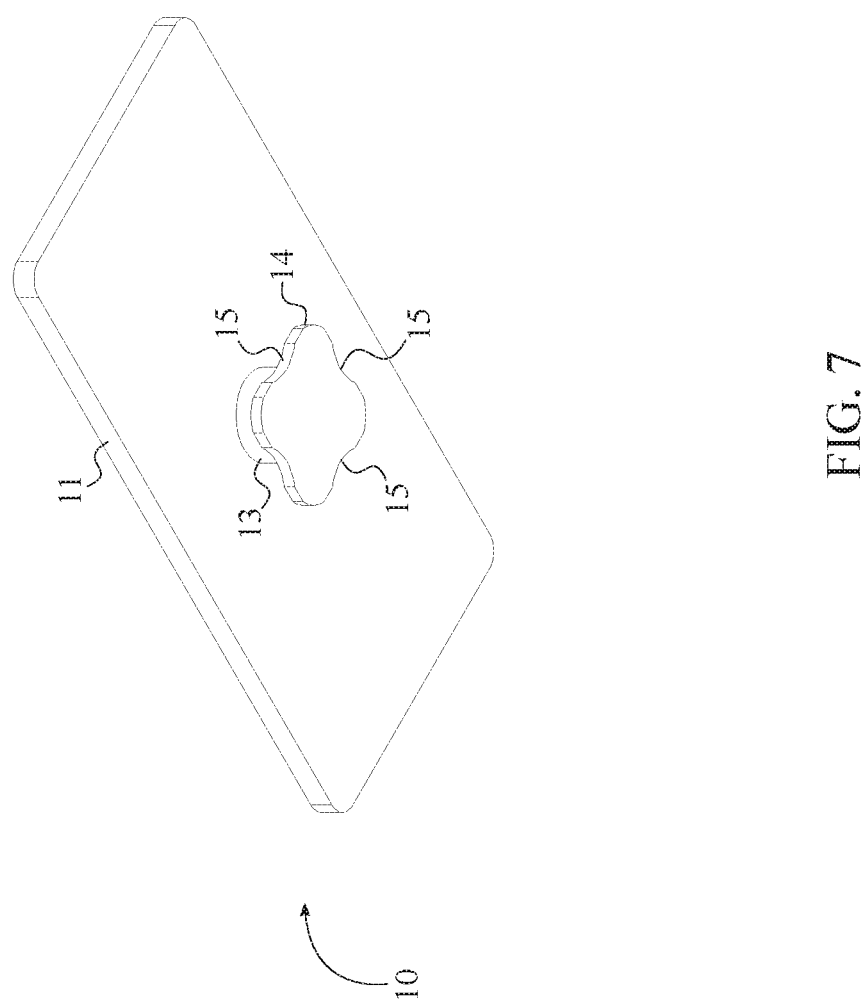
FIG. 7 is a bottom perspective view of the male fastener body of the present invention.
Figure 11:
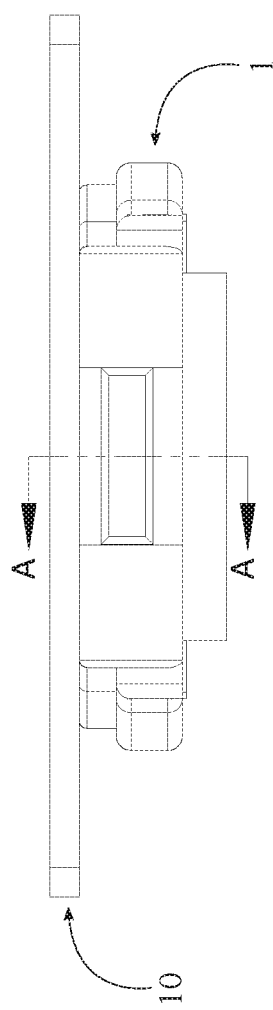
FIG. 11 is a side view of the present invention, showing the plane upon which a cross sectional view is taken shown in FIG. 12.
Figure 12:
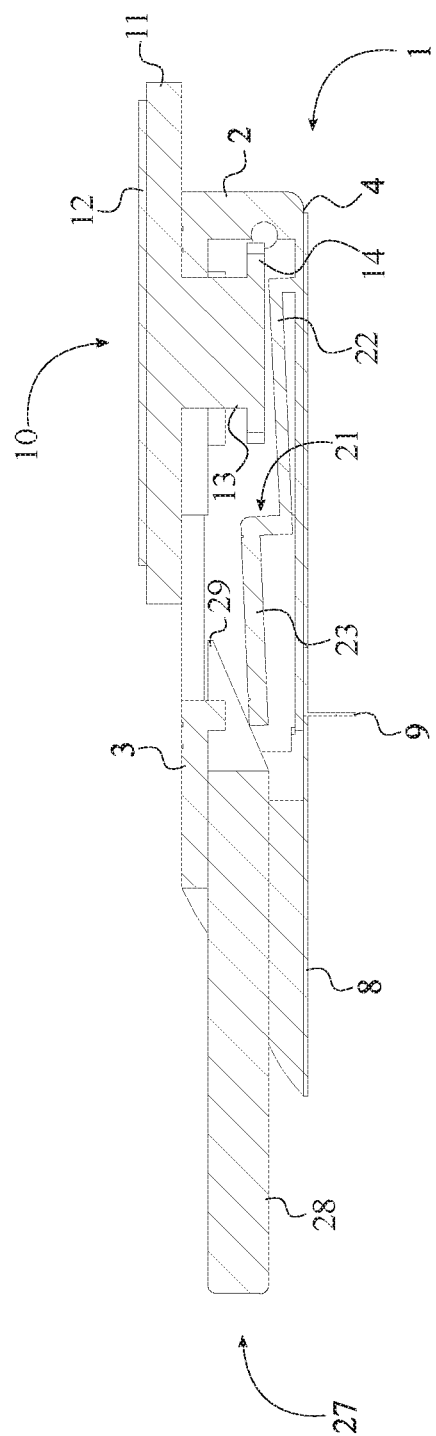
FIG. 12 is a cross section view the present invention taken along line A-A of FIG. 11, showing the female fastener body, the male fastener, the locking mechanism, and the release button locking mechanism of the present invention

The male fastener body 10 that secures a device comprises a device receiving platform 11, a second adhesive layer 12, and at least one locking cavity 15 in addition to the mounting stud 13 and the flange 14. In reference to FIG. 7-9, the device receiving platform 11 is terminally connected to the mounting stud 13 from one end. The flange 14 is terminally and perimetrically connected to the mounting stud 13 and positioned opposite of the device receiving platform 11. The second adhesive layer 12 is adjacently positioned with the device receiving platform 11 and positioned opposite of the mounting stud 13. The second adhesive layer 12 is perimetrically superimposed over the device receiving platform 11 so that the second adhesive layer 12 can secure a device onto the device receiving platform 11. The at least one locking cavity 15 laterally traverses into the flange 14, wherein the at least one locking cavity 15 and the mounting stud 13 collectively engage with the locking mechanism 20 through the mounting socket 5. As shown in FIG. 10-12, the mounting stud 13 traverses into the stadium section 6 of the mounting socket 5 through the circular section 7 of the mounting socket 5 thus engaging the mounting stud 13 with the locking plate 21 of the locking mechanism 20 and positioning the flange 14 below the ornamental front wall 3. More specifically, when the mounting stud 13 is inserted into the mounting socket 5, the mounting stud 13 is positioned atop the first platform 22 and engaged with the second platform 23 due to the offset positioning of the first platform 22 and the second platform 23. Additionally, the neutral positioning of the first platform 22 applies pressure to the mounting stud 13 within the encasement 2 so that the flange 14 can be pressed against the ornamental front wall 3 within the encasement 2. The at least one locking cavity 15 is then engaged with the pair of guide tracks 24, securing the flange 14. More specifically, the at least one locking cavity 15 is laterally engaged with the waved section 26 of the pair of guide tracks 24 thus locking the final positioning of the device receiving platform 11. For example, the at least one locking cavity 15 allows the device receiving platform 11 to be positioned vertically or horizontally.

Figure 8:
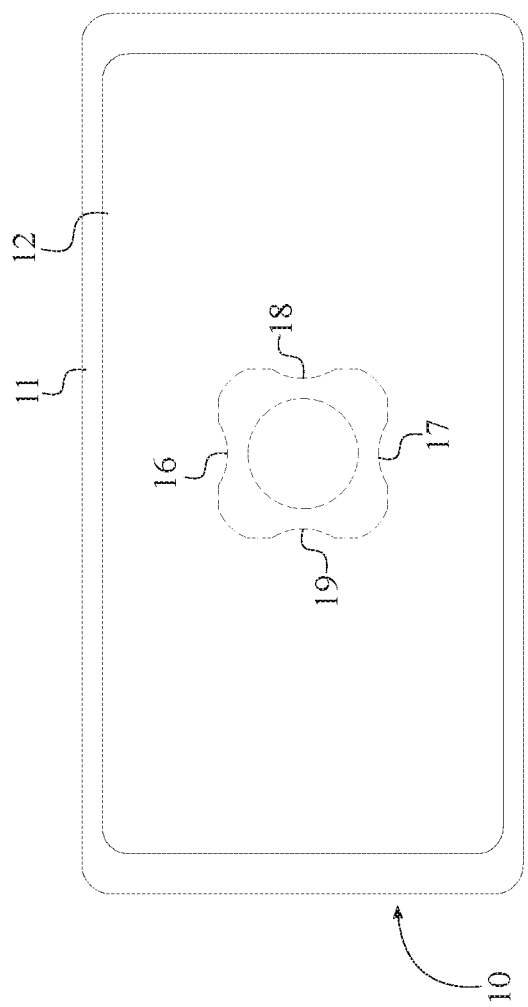
FIG. 8 is a top view of the male fastener body of the present invention.
Figure 9:
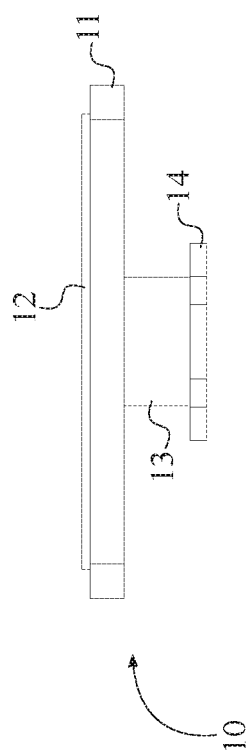
FIG. 9 is a side view of the male fastener body of the present invention.

In reference to FIG. 8, the at least one locking cavity 15 comprises a first locking cavity 16, a second locking cavity 17, a third locking cavity 18, and a fourth locking cavity 19. The first locking cavity 16, the second locking cavity 17, the third locking cavity 18, and the fourth locking cavity 19 are equally spaced apart from each other around the flange 14 so that the wave section of the pair of guide tracks 24 can be engaged with a pair of locking cavities from the at least one locking cavity 15. For example, when the device receiving platform 11 is in a vertical position or a horizontal position, a pair of locking cavities that is diametrically opposite of each other is engaged with corresponding wave section of the pair of guide tracks 24.

Although the invention has been explained in relation to its preferred embodiment, it is to be understood that many other possible modifications and variations can be made without departing from the spirit and scope of the invention as hereinafter claimed.

What is claimed is:

1. A male and female mounting assembly comprising:
a female fastener body;
a male fastener body;
a locking mechanism;
a release button;
the female fastener body comprising an encasement and a mounting socket;
the mounting socket traversing into the encasement through an ornamental front wall of the encasement;
the locking mechanism being integrated within the encasement;
the release button being laterally traversing into the encasement;
the release button being operatively coupled to the locking mechanism within the encasement;
a mounting stud and a flange of the male fastener body being removably engaged with the mounting socket through the locking mechanism;
the mounting socket comprising a stadium section and a circular section;
the circular section being positioned adjacent to the release button;
the stadium section being positioned adjacent to the circular section, opposite of the release button; and
a diameter of the circular section being larger than a diameter of the stadium section.

2. The male and female mounting assembly as claimed in claim 1 comprising:
the female fastener body further comprising a first adhesive layer and a bracket;
the bracket being positioned opposite of the mounting socket;
the bracket being externally connected to a rear wall of the encasement; and
the first adhesive layer being perimetrically superimposed over the rear wall and encircled around the bracket.

3. The male and female mounting assembly as claimed in claim 1 comprising:
the locking mechanism comprising a locking plate and a pair of guide tracks;
the locking plate being terminally connected to the encasement; and
the pair of guide tracks being positioned along the locking plate and connected to the encasement.

4. The male and female mounting assembly as claimed in claim 3 comprising:
a first platform of the locking plate being terminally connected within the encasement;
a second platform of the locking plate being terminally connected to the first platform;
the first platform and the second platform being positioned offset of each other;
the first platform being adjacently positioned with a rear wall of the encasement; and
the second platform being adjacently positioned with the ornamental front wall.

5. The male and female mounting assembly as claimed in claim 3 comprising:
the pair of guide tracks comprising an elongated section and a waved section;
the elongated section being positioned adjacent to a second platform of the locking plate; and
the waved section being positioned adjacent to a first platform of the locking plate.

6. The male and female mounting assembly as claimed in claim 1 comprising:
the release button comprising an elongated body and at least one incline leg;
the elongated body laterally traversing into the encasement;
the at least one incline leg being positioned within the encasement;
the at least one incline leg being terminally connected to the elongated body; and
the at least one incline leg being operatively coupled with a locking plate of the locking mechanism.

7. The male and female mounting assembly as claimed in claim 6, wherein a second platform of the locking plate being operatively coupled with the at least one incline leg.

8. The male and female mounting assembly as claimed in claim 1 comprising:
the male fastener body comprising a device receiving platform and a second adhesive layer;
the device receiving platform being terminally connected to the mounting stud;
the second adhesive layer being positioned adjacent to the device receiving platform, opposite of the mounting stud;
the second adhesive layer being perimetrically superimposed over the device receiving platform; and
the flange being terminally connected to the mounting stud, opposite of the device receiving platform.

9. The male and female mounting assembly as claimed in claim 1 comprising:
the male fastener body comprising at least one locking cavity; and
the at least one locking cavity laterally traversing into the flange.

10. The male and female mounting assembly as claimed in claim 9 comprising:
the at least one locking cavity comprising a first locking cavity, a second locking cavity, a third locking cavity, and a fourth locking cavity; and
the first locking cavity, the second locking cavity, the third locking cavity, and the fourth locking cavity being equally spaced apart from each other around the flange.

11. The male and female mounting assembly as claimed in claim 1 comprising:
the mounting stud traversing into the stadium section of the mounting socket through the circular section of the mounting socket;
the mounting stud being engaged with a locking plate of the locking mechanism; and
at least one locking cavity of the male fastener body being engaged with a pair of guide tracks of the locking mechanism.

12. The male and female mounting assembly as claimed in claim 11 comprising:
the mounting stud being engaged with a second platform of the locking plate; and
the at least one locking cavity being engaged with a waved section of the pair of guide tracks.

13. A male and female mounting assembly comprising:
a female fastener body;
a male fastener body;
a locking mechanism;
a release button;

the female fastener body comprising an encasement, a mounting socket, a first adhesive layer, and a bracket;

the locking mechanism comprising a locking plate and a pair of guide tracks;

the mounting socket traversing into the encasement through an ornamental front wall of the encasement;

the locking mechanism being integrated within the encasement;

the release button being laterally traversing into the encasement;

the release button being operatively coupled to the locking mechanism within the encasement;

the bracket being positioned opposite of the mounting socket;

the bracket being externally connected to a rear wall of the encasement;

the first adhesive layer being perimetrically superimposed over the rear wall and encircled around the bracket;

the locking plate being terminally connected to the encasement;

the pair of guide tracks being positioned along the locking plate and connected to the encasement; and a mounting stud and a flange of the male fastener body being removably engaged with the mounting socket through the locking plate and the pair of guide tracks.

14. The male and female mounting assembly as claimed in claim 13 comprising:

the mounting socket comprising a stadium section and a circular section;

the circular section being positioned adjacent to the release button;

the stadium section being positioned adjacent to the circular section, opposite of the release button; and a diameter of the circular section being larger than a diameter of the stadium section.

15. The male and female mounting assembly as claimed in claim 13 comprising:

a first platform of the locking plate being terminally connected within the encasement;

a second platform of the locking plate being terminally connected to the first platform;

the first platform and the second platform being positioned offset of each other;

the first platform being adjacently positioned with the rear wall of the encasement;

the second platform being adjacently positioned with the ornamental front wall;

the pair of guide tracks comprising an elongated section and a waved section;

the elongated section being positioned adjacent to the second platform of the locking plate; and the waved section being positioned adjacent to the first platform of the locking plate.

16. The male and female mounting assembly as claimed in claim 13 comprising:

the release button comprising an elongated body and at least one incline leg;

the elongated body laterally traversing into the encasement;

the at least one incline leg being positioned within the encasement;

the at least one incline leg being terminally connected to the elongated body;

the at least one incline leg being operatively coupled with the locking plate of the locking mechanism; and a second platform of the locking plate being operatively coupled with the at least one incline leg.

17. The male and female mounting assembly as claimed in claim 13 comprising:

the male fastener body comprising a device receiving platform and a second adhesive layer;

the device receiving platform being terminally connected to the mounting stud;

the second adhesive layer being positioned adjacent to the device receiving platform, opposite of the mounting stud;

the second adhesive layer being perimetrically superimposed over the device receiving platform; and the flange being terminally connected to the mounting stud, opposite of the device receiving platform.

18. The male and female mounting assembly as claimed in claim 13 comprising:

the male fastener body comprising at least one locking cavity;

the at least one locking cavity laterally traversing into the flange;

the at least one locking cavity comprising a first locking cavity, a second locking cavity, a third locking cavity, and a fourth locking cavity; and the first locking cavity, the second locking cavity, the third locking cavity, and the fourth locking cavity being equally spaced apart from each other around the flange.

19. The male and female mounting assembly as claimed in claim 13 comprising:

the mounting stud traversing into a stadium section of the mounting socket through a circular section of the mounting socket;

the mounting stud being engaged with a second platform of the locking plate; and at least one locking cavity of the male fastener body being engaged with a waved section of the pair of guide tracks.

* * * * *